(12) United States Patent
Murrell et al.

(10) Patent No.: US 8,018,604 B2
(45) Date of Patent: Sep. 13, 2011

(54) MULTIFUNCTION SENSOR FOR AN IMAGE FORMING DEVICE

(75) Inventors: Niko Jay Murrell, Lexington, KY (US); Brian Allen Blair, Richmond, KY (US); Jason Lee Rowe, Richmond, KY (US); William Paul Cook, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 941 days.

(21) Appl. No.: 11/956,606

(22) Filed: Dec. 14, 2007

(65) Prior Publication Data

US 2009/0153922 A1   Jun. 18, 2009

(51) Int. Cl.
*G06K 15/00* (2006.01)

(52) U.S. Cl. ............... 358/1.12; 358/488; 271/258.01; 271/265.01

(58) Field of Classification Search .................. 358/1.12, 358/474, 488, 498; 250/234, 236; 271/258.01, 271/265.01
See application file for complete search history.

(56) References Cited

U.S. PATENT DOCUMENTS

| | | | |
|---|---|---|---|
| 6,330,424 B1 | 12/2001 | Chapman et al. | |
| 7,346,206 B2 * | 3/2008 | Hill et al. | 382/141 |
| 2005/0035540 A1 * | 2/2005 | Carter et al. | 271/303 |
| 2005/0051949 A1 * | 3/2005 | Carter et al. | 271/258.01 |

* cited by examiner

*Primary Examiner* — Thomas D Lee
(74) *Attorney, Agent, or Firm* — John Victor Pezdek (57) ABSTRACT

The present application is directed to methods and devices for determining the presence of a module and presence of a media sheet in a media path using output signals from a single sensor in an image forming device. One embodiment includes a sensor which may be oriented in a variety of positions through interaction with the module and the media sheet. An algorithm may be used to determine the presence of the module in a module insertion path and presence of the media sheet in the media path based on the position of the sensor.

20 Claims, 8 Drawing Sheets

MULTIFUNCTION SENSOR FOR AN IMAGE FORMING DEVICE

BACKGROUND

The present application is directed to methods and devices for controlling operation of an image forming device and, more specifically, to methods and devices for detecting the presence of machine modules installed in the image forming device as well as the presence of a media sheet as it moves along a media path within the image forming device.

The image forming device moves a media sheet through an extended media path, beginning at an input area where the media sheet is picked from a removable media input tray or inserted through a manual feed. The media sheet undergoes numerous operations along the media path such as image transfer onto the media sheet, and adhering the image to the media sheet.

Several sensing functions may be desired for controlling operation of the image forming device, such as detecting the leading edge position of the media sheet and presence of the media sheet in the media path. In addition, operation of the image forming device may depend on proper installation of various removable machine modules. For example, the image forming device may not operate if the media input tray is not installed or is not installed properly or if a cover is open.

Using a separate sensor for each of these sensing functions may increase the cost and complexity of the image forming device. In addition, more complex sensors that produce a variable signal in response to a sensed signal may require frequent calibration which may affect reliability and increase maintenance requirements. Image forming devices, however, should be constructed in an economical manner without adversely impacting reliability. Both cost reduction and improved system reliability may be obtained by integrating the functions of a plurality of sensors into fewer components.

SUMMARY

With the above in mind, in one or more embodiments, the teachings are directed to a dual-purpose sensor that allows an image forming device to use one sensor to detect a machine module and passage of a media sheet along a media path. As a non-limiting advantage, this dual-purpose sensor reduces machine cost by using the same sensor (and, optionally, any associated sensor electronics) for two purposes, thereby avoiding the need to implement separate module detection and media sheet detection sensors.

In at least one embodiment, the dual-purpose sensor includes a movable body positioned within the image forming device such that a position of a machine module, e.g., a media tray, causes the body to move from a first position to a second position. Further, with the contemplated configuration, passage of a media sheet along the media path moves the body from the second position to a third position.

Complementing this positioning arrangement, the movable body includes one or more sensor actuation features that trip or otherwise activate an associated sensor circuit. In at least one embodiment, the sensor actuation features comprise an opening that selectively passes or blocks a signal from a receiver, depending upon the movable body's position.

Regardless of the particular implementation details, it should be understood that a detection signal, e.g., a logic-level indicator, can be made to indicate the position of the movable body. With such an arrangement, detecting that the movable body has tripped the associated sensor circuit may not, by itself, indicate whether the movable body is in a particular position.

Therefore one or more embodiments of the image forming device includes a controller (e.g., microprocessor, programmable logic circuit, etc.) that is configured to interpret the dual-purpose sensor's detection signal based on additional information. For example, the controller may be configured to interpret the detection signal based on an operating state or condition of the image forming device.

In one embodiment, the controller knows whether a media sheet feed event has recently occurred. Thus, the controller can evaluate whether the detection signal indicates movement of the movable body from one position to another, based in whole or in part on the time proximity between the feed event and activation of the detection signal. Additionally, the controller knows how much time should normally elapse during passage of the media sheet, and thus can detect sheet misfeeds/jams by detecting how long the detection signal remains activated in conjunction with a feed event.

DETAILED DESCRIPTION

Figure 1:
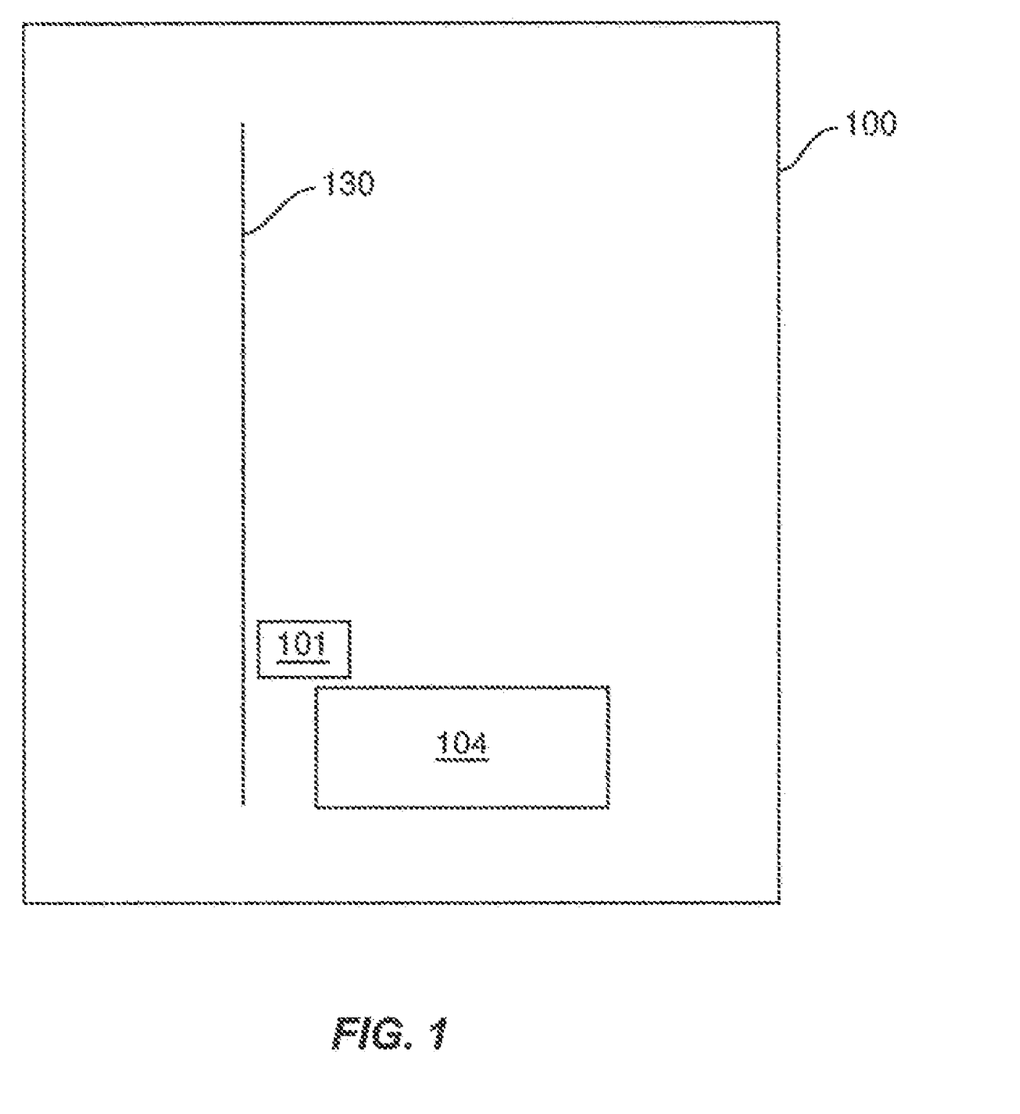
FIG. 1 is a schematic diagram of a first and second sensor according to one embodiment.

The present application is directed to methods and devices for determining the presence of a machine module and presence of a media sheet in a media path using output signals from a single sensor in an image forming device. One embodiment as illustrated schematically in FIG. 1 includes a sensor 101 positioned to detect two separate occurrences within an image forming device 100. Sensor 101 is positioned to determine whether a machine module 104 is inserted within the image forming device 100. Sensor 101 is also positioned to determine the movement of a media sheet along a media path 130. Sensor 101 may be able to detect a variety of different machine modules 104. Embodiments of the module 104 include but are not limited to a media tray, toner cartridge, fuser, and intermediate transfer belt unit. The module 104 may also include any interior or exterior cover or door that may be opened or removed.

Figure 2:
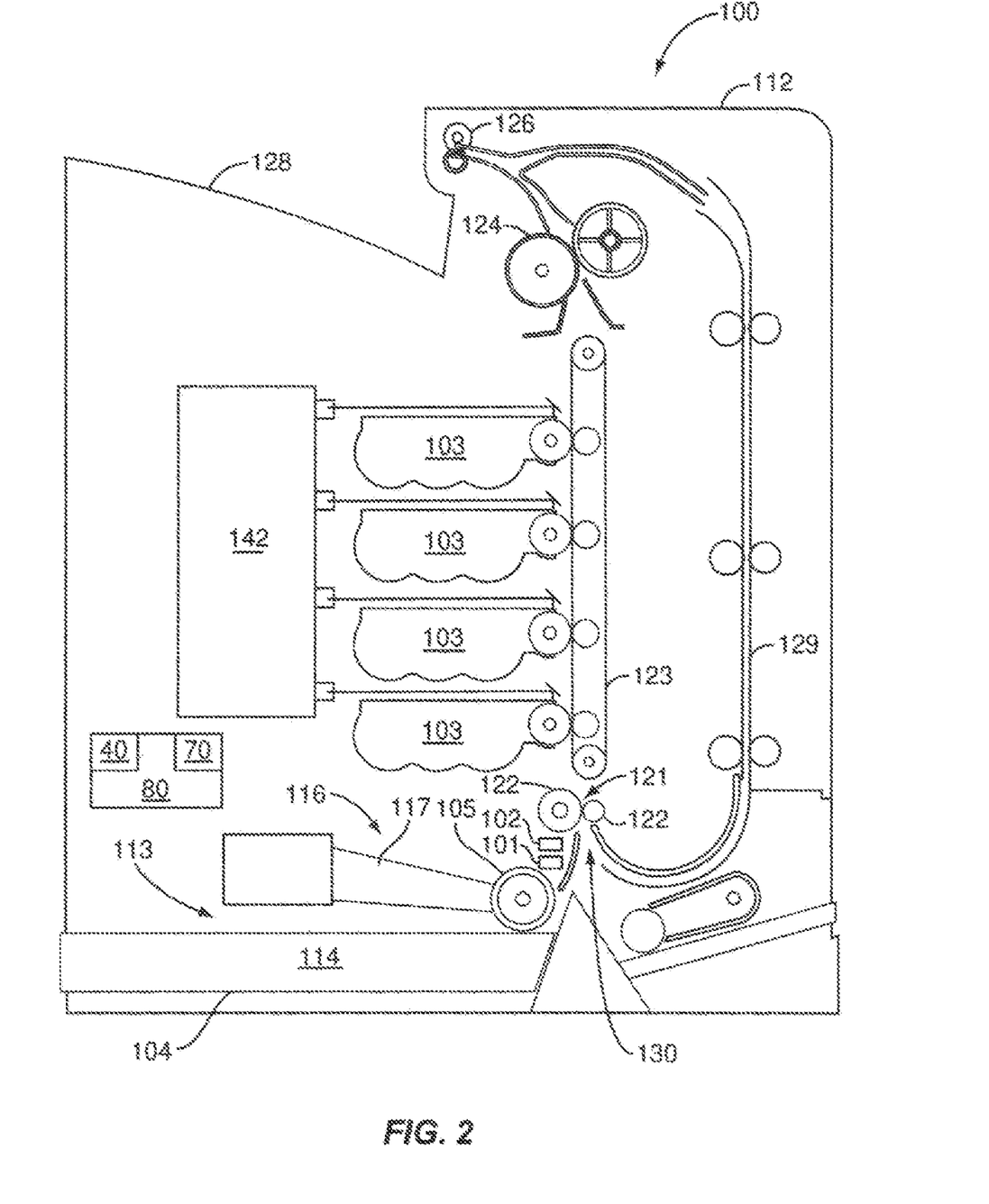
FIG. 2 is a schematic diagram of an image forming device according to one embodiment.

The method and devices may be implemented in an image forming device 100 generally illustrated in FIG. 2 and may be implemented in various embodiments disclosed herein. The image forming device 100 comprises an input area 113 that includes a media tray 104 sized to hold a stack of media sheets 114. The media tray 104 may be disposed in a lower portion of a main body 112 of the image forming device 100, and is preferably removable for refilling. A pick mechanism 116 moves media sheets 114 from the media tray 104 into the media path 130. Pick mechanism 116 comprises a pivoting arm 117 and a pick tire 105 that rests on the top-most sheet 114 in the stack. Pick mechanism 116 picks the top-most media sheet 114 from the stack and moves the media sheet 114 into the media path 130.

A registration nip 121 formed between rollers 122 aligns the media sheet 114 prior to passing to a transport belt 123 and past a series of image forming stations 103. A laser assembly 142 forms a latent image on a photoconductive member in each image forming station 103. Toner is then transferred to the photoconductive members to form toner images. The toner images are then transferred from the image forming stations 103 to the passing media sheet 114.

Color image forming devices typically include four image forming stations 103 for printing with cyan, magenta, yellow, and black toner to produce a four-color image on the media sheet 114. The transport belt 123 conveys the media sheet 114 with the color image thereon towards a fuser 124, which fixes the color image on the media sheet 114. Exit rollers 126 either eject the media sheet 114 to an output tray 128, or direct it into a duplex path 129 for printing on a second side of the media sheet 114. In the latter case, the exit rollers 26 partially eject the media sheet 114 and then reverse direction to invert the media sheet 114 and direct it into the duplex path 129. A series of rollers in the duplex path 129 return the inverted media sheet 114 to the primary media path 130 for printing on the second side of the media sheet 114.

A controller 80 oversees operation of the image forming device 100 including the timing of the toner images and movement of the media sheets 114. In one embodiment, controller 80 includes a microprocessor 40 and memory 70. In one embodiment, controller 80 includes random access memory, read only memory, and in input/output interface. Controller 80 monitors the location of the toner images on the photoconductive members. In one embodiment, controller 80 monitors scan data from the laser assembly and the number of revolutions and rotational position of the one or more motors that drive the photoconductive members. The number of revolutions and rotational position of motor(s) may be ascertained by an encoder.

Controller 80 further tracks the position of media sheets moving along the media path 130. The media path 130 includes a series of rollers (e.g., registration rollers 122, belt rollers) that are rotated by one or more motors to control the speed and position of each media sheet. The original position of the media sheets may be detected as they move past sensors 101 or 102. The controller 80 may track the incremental position of the media sheets based on the number of revolutions and rotational positions of the roller motor(s). The exact location may also be determined by other sensors that may be positioned along the media path 130. One embodiment of a controller that tracks the operation of the image forming device is disclosed in U.S. Pat. No. 6,330,424, herein incorporated by reference.

Sensor 101 may be located at a variety of positions within the image forming device 100. In the embodiment of FIG. 2, sensor 101 is positioned in proximity to the input area 113 and upstream from the image forming stations 103. In this embodiment, sensor 101 senses whether the media tray 104 is present and a position of a media sheet 114 moving along the media path 130.

Figure 3A:
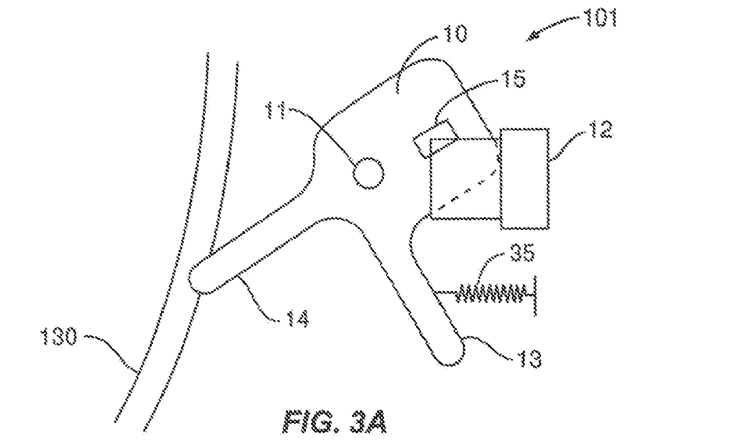
FIGS. 3A-3C are schematic diagrams of a variety of positions of a sensor according to one embodiment.

One embodiment of the sensor 101 as illustrated in FIG. 3A includes a body 10 and a detector 12. The body 10 may be pivotable about a shaft 11 and movable in a variety of positions relative to the detector 12. In one embodiment, a biasing member 35 extends between the body 10 and image forming body 112 to urge the body 10 toward the position illustrated in FIG. 3A. The body 10 may have a generally rectangular shape. However, other shapes are also contemplated as may be required for the body 10 to interact with elements within the image forming device 100 and the detector 12. For example, the body 10 may have a rounded shape or a triangular shape.

Figure 3B:
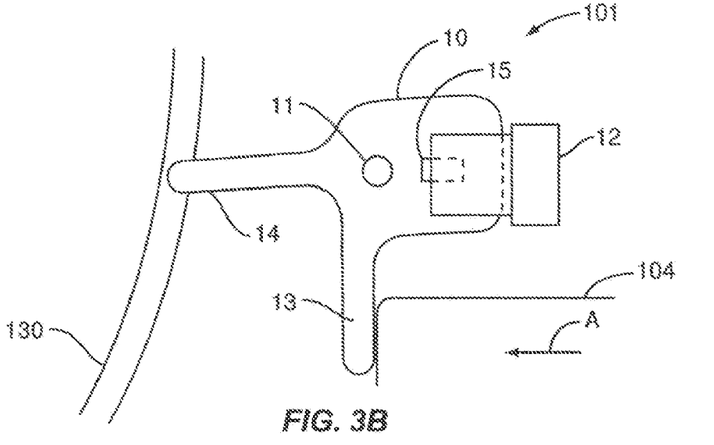
Figure 3C:
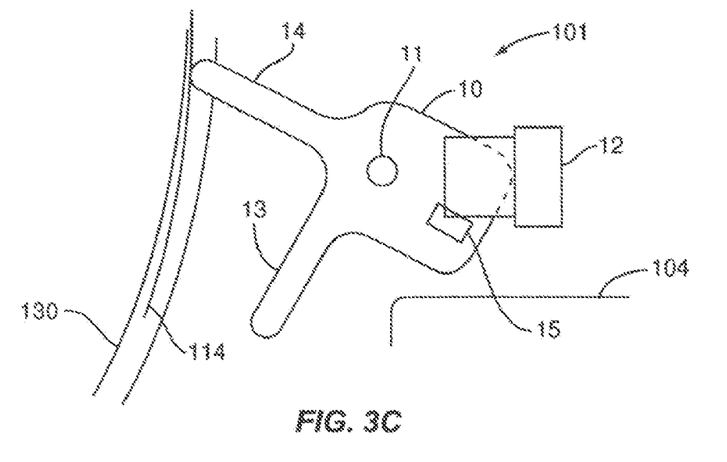

Body 10 may include first and second arms 13, 14 that extend outward from a main section. As the body 10 pivots about shaft 11, the first and second arms 13, 14 move between a variety of positions depending upon the position of a media sheet 114 in the media path 130 and the position of a machine module 104. The first and second arms 13, 14 may have a variety of lengths. The length of the first arm 13 is adequate to extend into the insertion path of the module 104 to be contacted as the module 104 is inserted into the image forming device body 112. The length of the second arm 14 is adequate to extend into the media path 130. In the embodiments of FIGS. 3A-3C, the first and second arms 13, 14 are oriented approximately 90 degrees apart from one another. The angle between the first and second arms 13, 14 may vary depending on the position of the body 10 relative to the module 104 and the media path 130. Additionally, the first and second arms 13, 14 may be coplanar or non-coplanar with one another.

In one embodiment as illustrated in FIG. 3A, the body 10 defaults to a first position when there are no other forces acting on it, such as contact with the module 104 or a media sheet 114 moving along the media path 130. The biasing member 30 may urge the body 10 toward the first position. In one embodiment, gravitational forces may act on the body 10 causing it rotate about the shaft 11. The second arm 14 and/or other appropriate part of the body 10 may be weighted to increase the gravitational force and further aid rotation of the body 10 toward the first position.

FIG. 3B illustrates the body 10 in a second position. Body 10 moves to the second position due to insertion of the module 104 into the image forming device body 112. In one embodiment as illustrated in FIG. 3B, the module 104 is inserted into the body 112 in the direction indicated by the arrow A. As the module 104 is inserted, a portion of the module 104 contacts the first arm 13, thereby causing the body 10 to move to a second position. In the second position, the second arm 14 may now be positioned within the media path 130. The module 104 remains in contact with the first arm 13 thereby preventing the body 10 from returning back to the first position.

FIG. 3C illustrates the body 10 in a third position. The third position occurs because the second arm 14 is positioned within the media path 130 and contacted by a media sheet 114 as it moves along the media path 130. The body 10 remains in the third position while the second arm 14 is in contact with the media sheet 114. Once the media sheet 114 passes beyond the second arm 14, the body 10 moves back to the second position. Similarly, the body 10 moves back to the first position when the module 104 is removed from the image forming device body 112.

Figure 4:
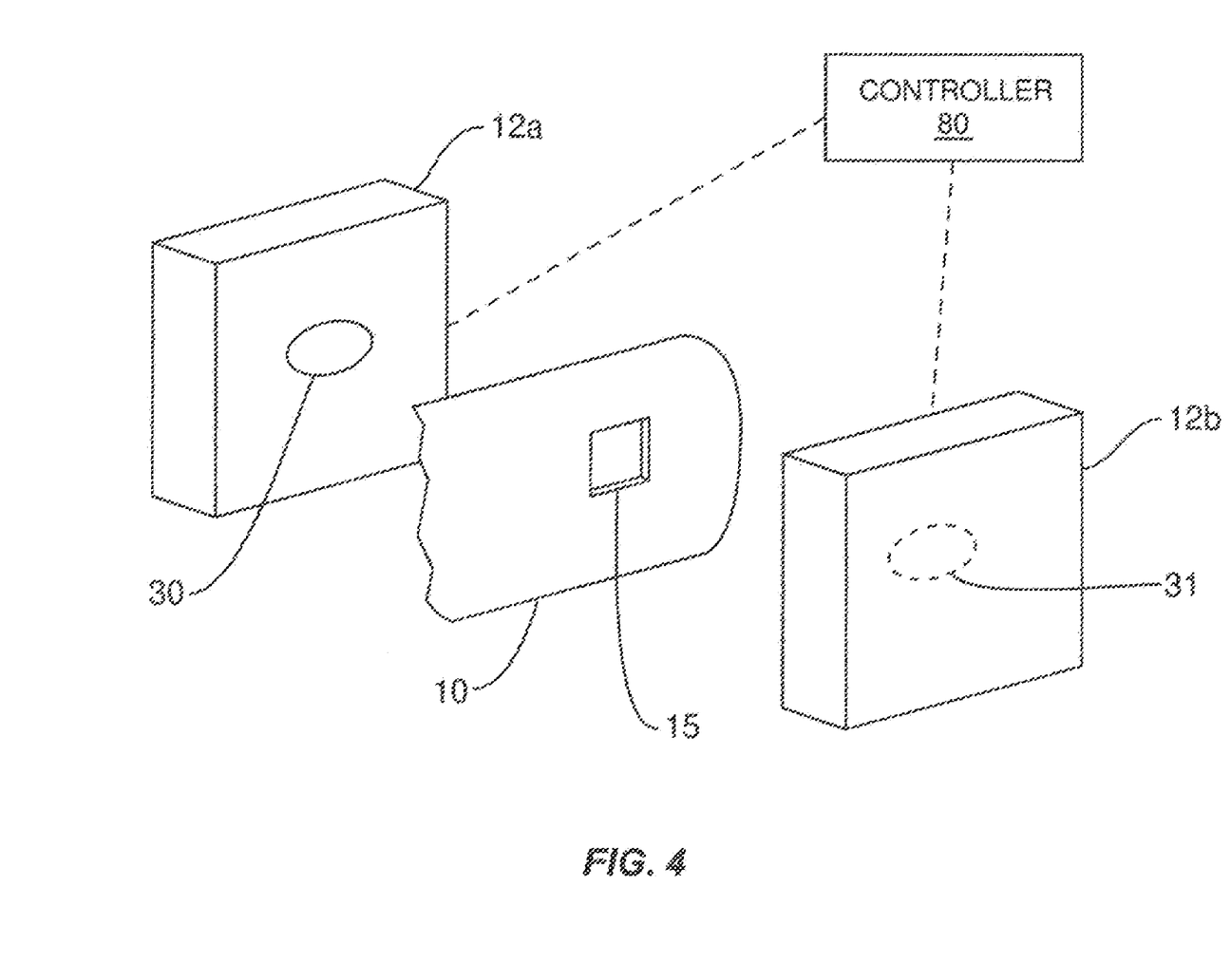
FIG. 4 is a schematic diagram of a sensor and a detector according to one embodiment.

The body 10 may include a detection section that interacts with the detector 12. In one embodiment as illustrated in FIG. 4, the detection section includes an opening 15 positioned within the body 10. The detector 12 includes an emitter 12a with transmitter 30 and a detector 12b with receiver 31. The body is positioned therebetween, and the opening 15 is sized for the signal to pass from the transmitter 30 to the receiver 31 when the body 10 is at a predetermined position. FIG. 4 illustrates the body 10 in the second position with the module 104 inserted and in contact with the first arm 13, and the second arm 14 positioned in the media path 130 (see FIG. 3B). In this second position, the opening 15 is aligned with the transmitter 30 and the receiver 31. A signal from the transmitter 30 passes through the opening 15 and is received by the receiver 31. When the body 10 is in the first or third position as illustrated in FIGS. 3A and 3C, the opening 15 is not aligned with the transmitter 30 and receiver 31 and prevents the signal from being received by the receiver 31. It is understood that other embodiments may include the opening 15 aligned with the detector 12 when the body 10 is in various positions.

The signal may include a variety of different formats. In one embodiment, an optical signal is used in which the transmitter 30 emits optical energy with a frequency spectrum that is detectable by the receiver 31. The transmitter 30 may generate any color or intensity of light. The transmitter 30 may generate monochromatic and/or coherent light, such as for example, a gas or solid-state laser. Alternatively, the transmitter 30 may emit non-coherent light of any color or mix of colors, such as any of a wide variety of visible light, infrared or ultraviolet light emitting diodes (LEDs), or incandescent bulbs. In one embodiment, the transmitter 30 generates optical energy in the infrared range, and may include an infrared LED. The receiver 31 may comprise any sensor or device operative to detect optical energy emitted by the transmitter 30. In one specific embodiment, the transmitter 30 is an infrared LED optical emitter and the receiver 31 is a silicon phototransistor optical detector. Other examples of types of detectors 12 that could be used to perform this function include transmission sensing, reflectance sensing, capacitance sensing, inductance sensing, and magnetically-based sensing.

The detector 12 communicates with the controller 80 to indicate receipt or non-receipt of the signal. The controller 80 interprets the communications from the detector 12 in combination with the overall image formation process to determine various occurrences that may occur within the image forming device 100.

Figure 5:
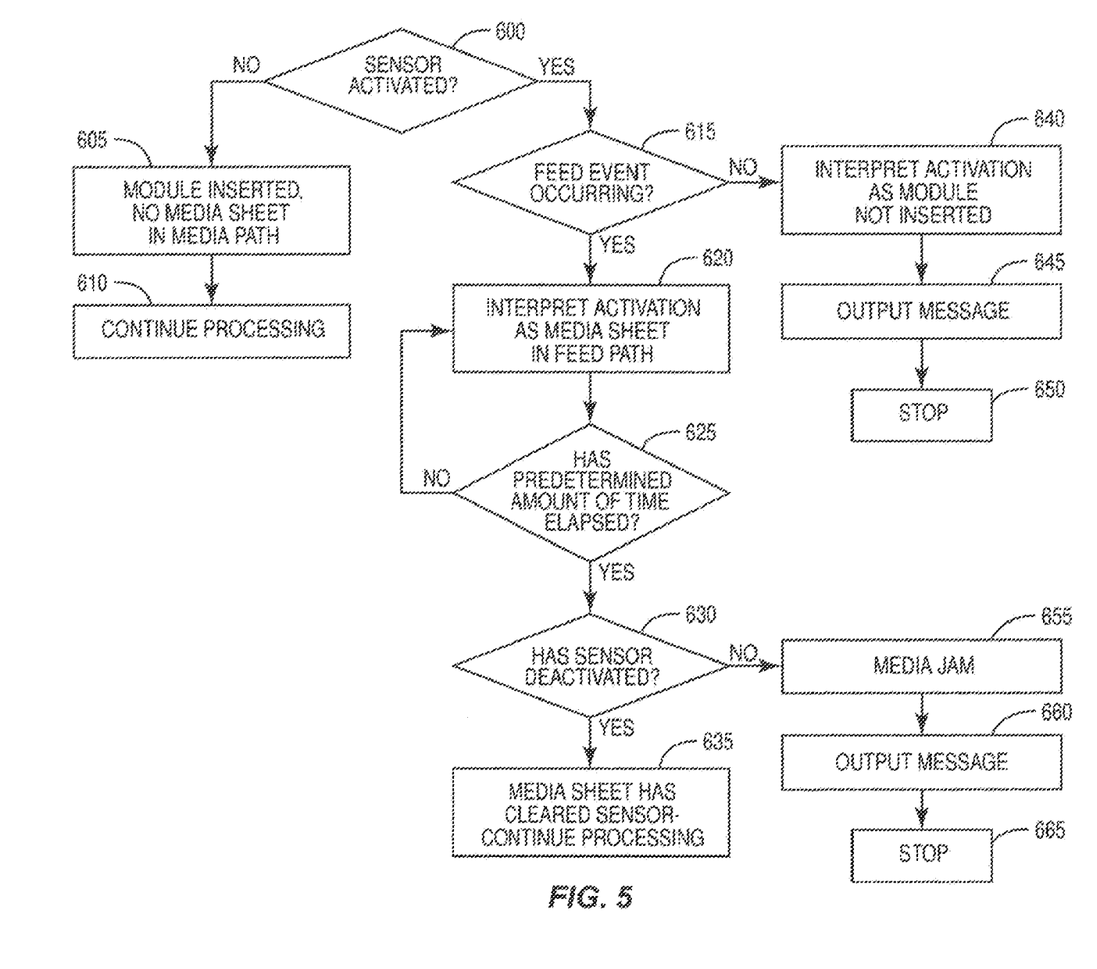
FIG. 5 is a flow diagram of a method of sensing conditions in an image forming device according to one embodiment.

FIG. 5 illustrates a flow diagram for one embodiment. This embodiment includes the sensor 101 described in FIGS. 3A-3C. In this embodiment, "activated" refers to the signal from the transmitter 30 not being received by the receiver 31 (i.e., the body 10 is blocking the signal). "Not activated" is interpreted when the signal is received by the receiver 30 (i.e., the opening 15 is aligned with the pathway between the transmitter 30 and receiver 31).

The controller 80 first determines whether the sensor 101 is activated (step 600). If the sensor 101 is not activated, that is, the sensor 101 is in the second position and the signal is being received by the receiver 31, then the controller 80 interprets that the module 104 is inserted into the image forming device body 112, and there is not a media sheet 114 in the media path 130 (step 605). The controller 80 then continues processing (step 610).

If the sensor 101 is activated, that is, the sensor 101 is in either the first or third position and the signal is not received by the receiver 31, then more than one possible condition may exist. First, the controller 80 determines whether a media sheet 114 feed event is occurring that could cause the body 10 to be in the third position (step 615). If so, then the activation is interpreted as a media sheet 114 in the media path 130 (step 620). Further, the controller 80 determines whether a predetermined amount of time has elapsed that corresponds to the time necessary for a media sheet 114 to pass beyond the sensor 101 (step 625). If the predetermined amount of time has not elapsed, the controller 80 continues to interpret the activation as the media sheet 114 being in the media path 130 and in contact with the body 10 (step 620). If the elapsed time has passed, the controller 80 determines whether the sensor 101 is not activated (i.e., returned to the second position) (step 630). If so, then the media sheet 114 has cleared the sensor 101 and the controller 80 continues processing (step 635). If the sensor 101 has not returned to being not activated, the controller 80 determines a media jam has occurred (step 655) and the controller 80 outputs a message (step 660). The controller 80 stops processing (step 665) and awaits a new input from the user.

If the feed event is not occurring (step 615), controller 80 interprets the activation as the module 104 not being inserted into the image forming device body 112 (step 640), outputs a message (step 645), and processing stops (step 650).

Figure 6:
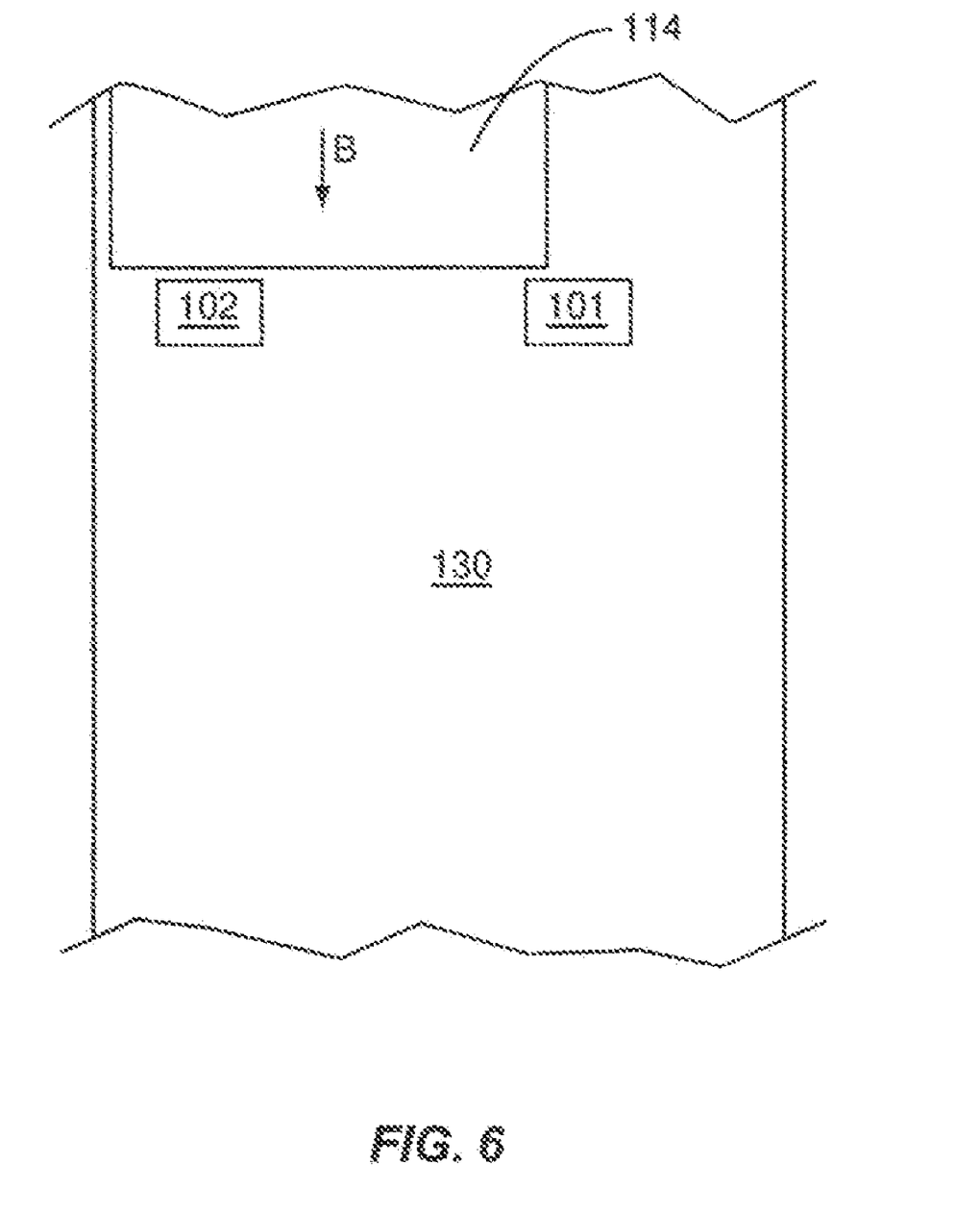
FIG. 6 is a schematic diagram of first and second sensors positioned across a media path according to one embodiment.

The sensor 101 may also be used in combination with a second sensor 102 for additional functionality in determining conditions within the image forming device 100. One embodiment includes the first sensor 101 positioned to detect the presence of the module 104 and the presence of a wide media sheet 114 moving in the direction of arrow B along the media path 130 as illustrated in FIG. 6. In this embodiment, the sensors 101, 102 are located at the same position along the media path 130, but spaced apart from one another in a direction corresponding to a width of the media sheet 114. Thus, the first sensor 101 is positioned to detect the presence of the module 104 and a wide media sheet 114, and the second sensor 102 is positioned to detect the presence of a media sheet 114 moving along the media path 130. In this embodiment, a wide media sheet 114 will contact both the first and second sensors 101, 102 essentially simultaneously, with a narrow sheet contacting just the second sensor 102.

The second sensor 102 may include a body that extends into the media path, an opening, and a transmitter and receiver (not shown) to detect the media sheets 114. In one embodiment, the second sensor 102 is activated when the body is in contact with a media sheet 114 and the signal is interrupted, and not activated when not in contact with a media sheet 114 and the signal is not interrupted.

The controller 80 may be programmed to accept a variety of signal combinations from the first and second sensors 101, 102 and determine whether the module 104 is inserted, the presence of the media sheet 114 in the media path 130, the width of the media sheet 114, and media jams. The following table lists the possible combinations and the conditions that will be deduced by the controller 80. For the first sensor 101, "activated" means that the signal is interrupted between the transmitter 30 and the receiver 31. "Not activated" means that the signal is not interrupted. For the second sensor 102, "activated" also means that the signal is interrupted, which corresponds to the second sensor 102 being in contact with the media sheet 114. "Not activated" means that the second sensor 102 is not in contact with the media sheet 114 and the signal is not interrupted.

| First Sensor | Second Sensor | Condition |
| --- | --- | --- |
| Not Activated | Not Activated | Module inserted |
| Not Activated | Activated | Module inserted and Narrow media present in the media path |
| Activated | Not Activated | Module not inserted or Media jam |
| Activated | Activated | Wide media present in the media path or Module not inserted or media jam |

When more than one possible condition exists, the controller 80 may resolve which is the correct condition through a logic analysis of immediately preceding events within the image forming device 100 or inputs from other sensors. For example, when the signal pathway is blocked for both the first and second sensors 101, 102, this may indicate that a wide media sheet 114 is present in the media path 130. However, both signal pathways being blocked may also indicate that the module 104 is not inserted or there is a jam. If the media sheet 114 is within the media path 130, then the controller 80 may determine that the signals from the first and second sensors 101, 102 indicate that a wide media sheet 114 is present in the media path 130. However, if a media sheet 114 should not be within the media path 130, then the controller 80 may determine that a jam has occurred or the module 104 is not inserted. Whether the media sheet 114 should be in the media path 130 may be determined by tracking the media sheet 114 as it moves through the media path 130 as discussed above.

Figure 7:
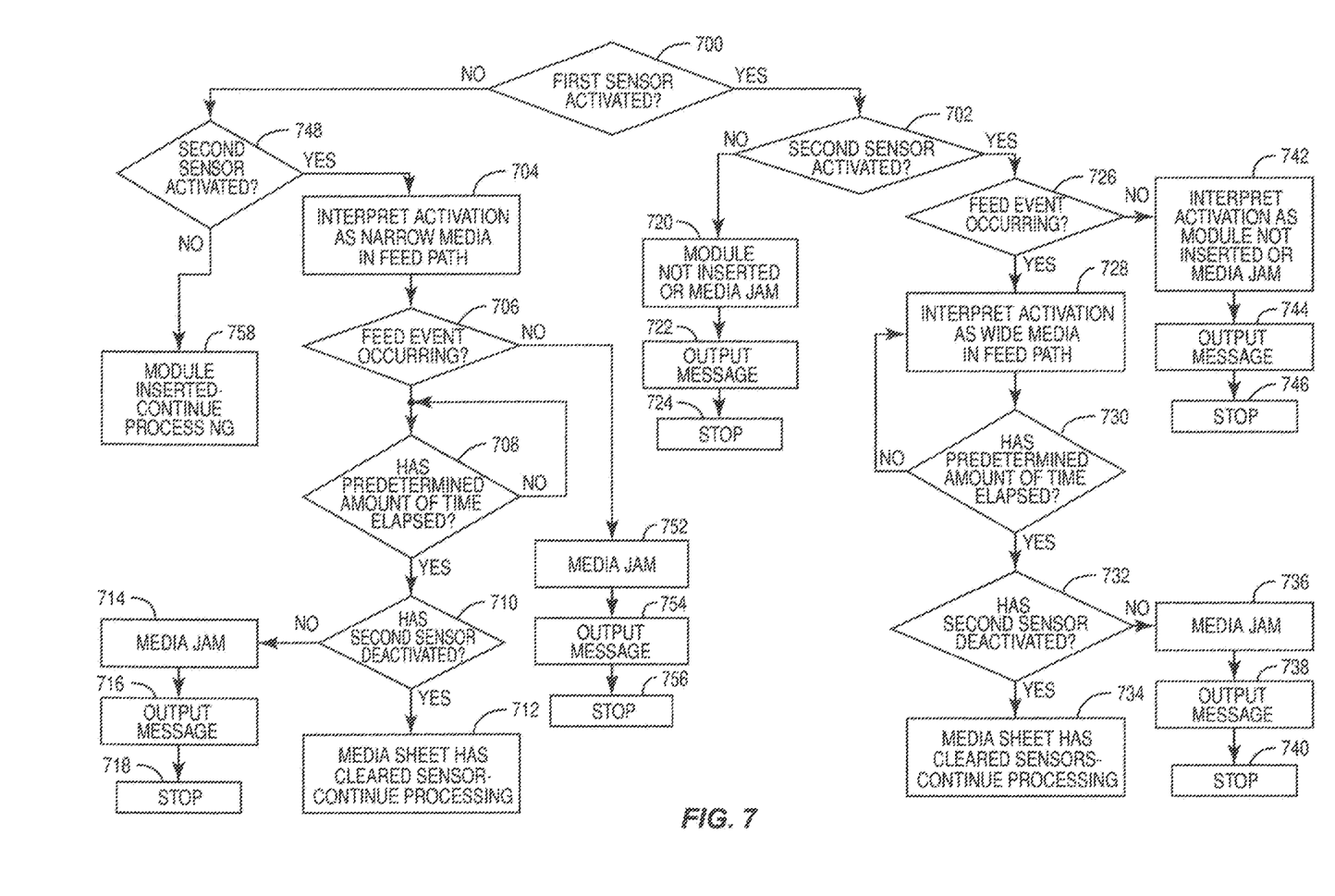
FIG. 7 is a flow diagram of a method of sensing conditions in an image forming device according to one embodiment.

FIG. 7 illustrates a flow diagram for one embodiment including both the first and second sensor 101, 102. The controller 80 first determines whether the first sensor 101 is activated (step 700). If the first sensor 101 is activated, the controller 80 then determines whether the second sensor 102 is activated (step 702). If the second sensor 102 is also activated, the controller 80 determines whether a media sheet 114 feed event is occurring (step 726). If so, the controller 80 interprets the activation of the first and second sensors 101, 102 as indicating a wide media sheet 114 in the media feed path 130 (step 728). The controller 80 determines whether a predetermined amount of time has elapsed that corresponds to the time for the media sheet 114 to pass beyond the first and second sensors 101, 102 (step 730). If the predetermined amount of time has not elapsed, controller 80 continues to interpret the activation as the wide media sheet 114 being in the media feed path 130 (step 728). If the elapsed time has passed, the controller 80 determines whether the second sensor 102 has deactivated (step 732). If so, then the media sheet 114 has cleared the first and second sensors 101, 102 and the controller 80 continues processing (step 734). If the first and second sensors 101 have not deactivated, then a media jam is determined (step 736) and the controller 80 outputs a message (step 738) and processing is stopped (step 740).

If a feed event is not occurring at step 726, controller 80 interprets the activation as the module 104 not being inserted or that a media jam has occurred (step 742), and outputs a message (step 744) and processing stops (step 746).

When the second sensor 102 is not activated at step 702, controller 80 interprets the activation of the first sensor 101 as the module not being inserted (step 720) or that a media jam has occurred and outputs a message (step 722) and processing stops (step 724).

If the first sensor 101 is not activated at step 700 controller 80 determines whether the second sensor 102 is activated (step 748). If the second sensor 102 is activated, the controller 80 interprets the activation of the second sensor 102 as indicating a narrow media sheet 114 in the media feed path 130 (step 704). The controller must then determine whether the sheet is in the process of being fed or is jammed, and checks whether a media sheet 114 feed event is occurring (step 706). If not, the controller 80 determines that a media jam has occurred (step 752). The controller 80 in response outputs a message (step 754) and processing stops (step 756).

If a media sheet 114 feed event is occurring at step 706, the controller 80 then determines whether a predetermined amount of time has elapsed for the media sheet 114 to clear the first sensor 101 (step 708). If the predetermined amount of time has not elapsed, the controller 80 continues to interpret the activation as the narrow media sheet 114 being in the media feed path 130 and continues to monitor the elapsed time (step 708). If the elapsed time has passed, then the controller 80 determines whether the second sensor 102 has deactivated (step 710). If so, then the media sheet 114 has cleared the second sensor 102 and the image forming device 100 may continue processing (step 712). If the second sensor 102 has not deactivated, then a media jam has occurred (step 714) and the controller 80 outputs a message (step 716) and processing is stopped (step 718). Alternately, if the second sensor 102 is not activated at step 748, then the module is inserted and the controller 80 continues processing (step 758).

Figure 8:
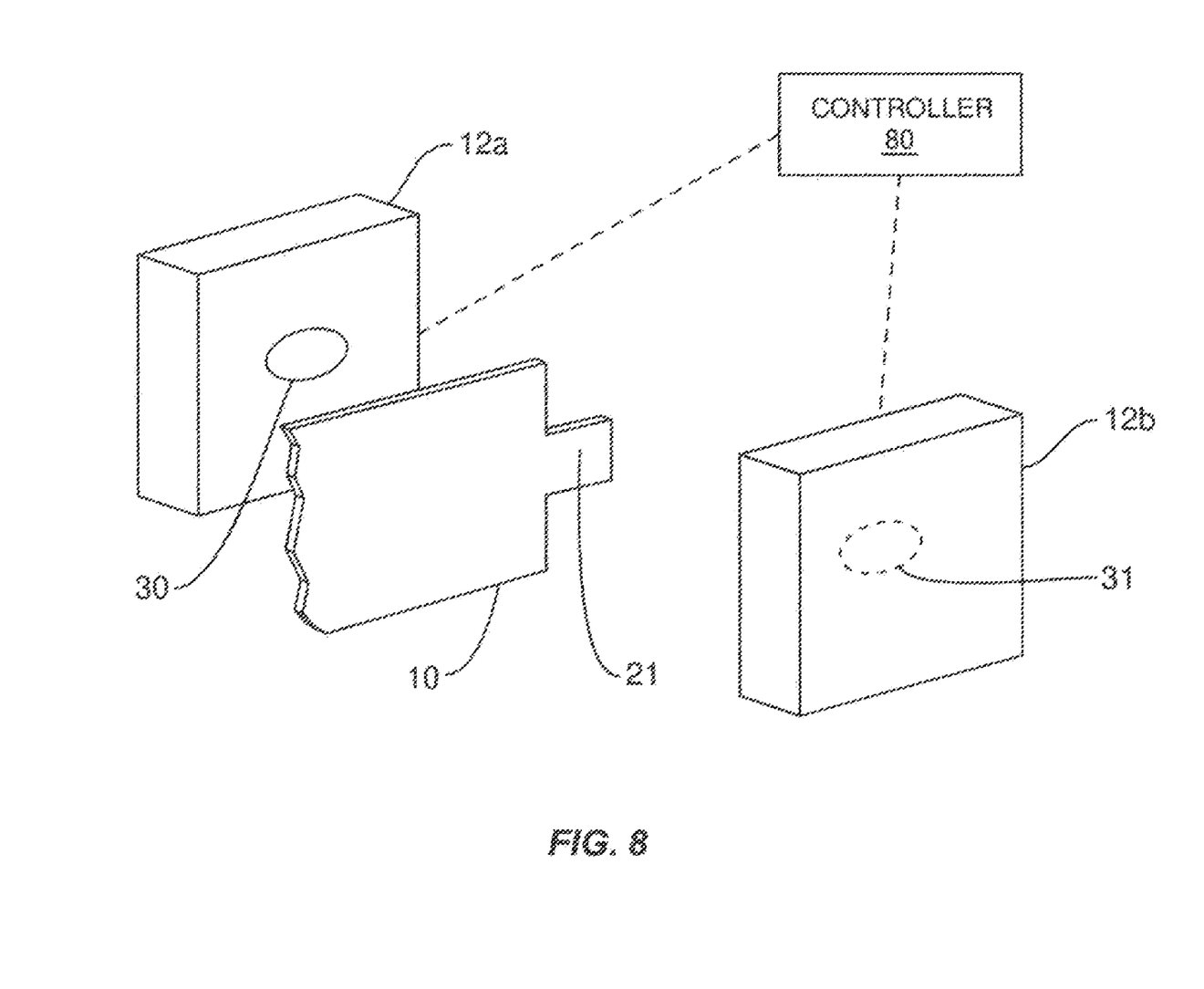
FIG. 8 is a schematic diagram of a sensor and a detector according to one embodiment.

In the embodiments disclosed herein, the operation of the first and second sensors 101, 102 could be reversed without affecting the methods and devices. For example, FIG. 8 illustrates an embodiment of the body 10 of the first sensor 101 wherein the detection section comprises a tab 21 that interrupts the signal between the emitter 12*a* and the detector 12*b* in the second position and does not interrupt the signal in the first and third positions. The algorithm used by the controller 80 could be modified to accept these opposite signals and act upon them accordingly without affecting the methods or devices. In addition, the location on the first and second sensors 101, 102 within the image forming device 100 could be reversed without affecting the methods of the device. The algorithm used by the controller 80 could be modified to treat a signal from the first sensor as indicating a narrow media sheet and a signal from the second sensor as indicating a wide media sheet.

The representative image forming device 100 illustrated in FIG. 2 is a color laser printer. However, it should be understood that the image forming device 100 may, in various details, take forms other than that described below. For example, the image forming device 100 may be a monochrome or color printer, a monochrome or color copier, a facsimile machine, an all-in-one device, or any other image forming device. FIG. 2 also illustrates the image forming device 100 utilizing vertical architecture. The present methods and devices may also be implemented with an image forming device 100 utilizing horizontal architecture.

Additionally, the representative image forming device 100 illustrated in FIG. 2 is referred to as a single-transfer device where the media sheet 114 is transported by a transport belt 123 past each image forming station 103 for direct transfer of toner images onto the media sheet 114. Other image forming devices 100 may use a dual-transfer system where the developed images are transferred first to an intermediate transfer belt (not shown) at the image forming stations 103 and then to the media sheet 114 at a secondary transfer nip (not shown). The methods presented here may be implemented with either a single-transfer device or a dual-transfer device.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A dual-purpose sensor to detect a module inserted into an image forming device and a media sheet within a media path comprising:
   a body with a main section, a first arm that extends outward from the main section in a first direction, and a second arm that extends outward from the main section in a second direction;
   a detector including a transmitter and a receiver that form a pathway therebetween, the transmitter positioned on a first side of the body and a receiver positioned on a second side of the body; and
   a detection section positioned on the main section of the body, the detection section configured to interact with the detector;
   the body being pivotal between first, second, and third positions, the first position including the first arm positioned in an insertion path of the module and the second arm positioned away from the media path, the second position including the second arm positioned in the media path, and the third position including the first arm positioned out of the insertion path of the module and the second arm positioned in contact with the media sheet in the media path;
   the detection section being positioned within the pathway formed by the transmitter and the receiver when the body is in the second position, and being positioned out of the pathway when the body is in at least one of the first, and third positions.

2. The sensor of claim 1, further comprising a biasing member attached to the body to bias the body towards one of the first, second, and third positions.

3. The sensor of claim 1, wherein the body is weighted to bias the body towards one of the first, second, and third positions.

4. The sensor of claim 1, wherein the first and second arms are spaced apart to form an angle.

5. The sensor of claim 1, wherein lengths of the first and second arms is about equal.

6. The sensor of claim 1, wherein the first and second arms are coplanar with the body.

7. The sensor of claim 1, wherein the detection section comprises an opening positioned within the main section of the body.

8. A dual-purpose sensor to detect a module inserted into an image forming device and a media sheet within a media path comprising:
   a movable body including first and second sections and an actuation feature, the body being positioned in proximity to a module insertion path and the media path;
   the body being in a first position with the first section extending into the module insertion path, a second position with the second section extending into the media path when the first section is in contact with the module in the module insertion path, and a third position with the module in the module insertion path and a media sheet in the media path;
   the actuation feature actuating a sensor circuit to sense the movement of the body between the first, second, and third positions.

9. The sensor of claim 8, wherein the first and second sections are positioned apart at a predetermined angle.

10. The sensor of claim 8, further comprising a biasing member to bias the body from the third position to the second position upon passage along the media path of the media sheet beyond the second section.

11. The sensor of claim 8, further comprising a biasing member to bias the body from the second position to the first position upon removal of the module from the module insertion path.

12. The sensor of claim 8, wherein the body is weighted to bias the body towards the first position.

13. A method of detecting a module and a media sheet within an image forming device comprising:
   biasing a body towards a first position with an arm that extends outward from the body positioned in a module insertion path and a second arm that extends outward from the body being away from a media path;
   positioning the body to be moved to a second position due to contact with the module being inserted into the module insertion path, the second position including the second arm extending into the media path;
   positioning the body to be moved to a third position due to contact between the second arm and the media sheet in the media path;
   determining a status of a media sheet feed event;
   sensing the movement of the body between the first, second, and third positions; and
   determining the positions of the module and the media sheet based on the position of the body and the status of the media sheet feed event.

14. The method of claim 13, further comprising positioning the body such that the first arm is spaced away from the module when the body is in the third position.

15. The method of claim 13, wherein sensing the movement of the body between the first, second, and third positions to determine the positions of the module and the media sheet comprises moving an opening in the body into and away from a pathway formed between a transmitter and a receiver as the body moves between the first, second, and third positions.

16. The method of claim 13, further comprising pivoting the body between the first, second, and third positions.

17. The method of claim 13, further comprising positioning the body to return to the second position after passage of the media sheet beyond the second arm.

18. The method of claim 17, further comprising positioning the body to return the body to the first position after removal of the module from the module insertion path.

19. The method of claim 13, wherein biasing the body towards the first position comprises weighting the body to return towards the first position.

20. The method of claim 13, wherein biasing the body toward the first position comprises attaching a biasing member to the body to bias the body to return to the first position.

* * * * *